Nov. 17, 1931.   F. H. MUELLER   1,832,725

HIGH PRESSURE INVERTED PLUG VALVE

Filed Dec. 29, 1928

Inventor

Frank H. Mueller,

By Cushman Darby Darby

Attorneys

Patented Nov. 17, 1931

1,832,725

UNITED STATES PATENT OFFICE

FRANK H. MUELLER, OF DECATUR, ILLINOIS, ASSIGNOR TO MUELLER CO., OF DECATUR, ILLINOIS, A CORPORATION OF ILLINOIS

HIGH PRESSURE INVERTED PLUG VALVE

Application filed December 29, 1928. Serial No. 329,170.

This invention relates to new and useful improvements in high pressure inverted plug valves, the important object of which is to provide against any possible leakage of gas or other fluid by the provision of improved packing means at both ends of the tapered valve.

Another important object of the invention is to provide an improved packing gland for the small end of the tapered plug valve, which may be rendered gas or fluid tight without exerting unseating pressure upon the valve.

A further object of the invention is to provide improved means for limiting rotary movement of the plug valve.

Other objects and advantages of the invention will become apparent during the course of the following description.

In the accompanying drawings forming a part of the application, and wherein like numerals are employed to designate like parts throughout the several views.

Figure 1:
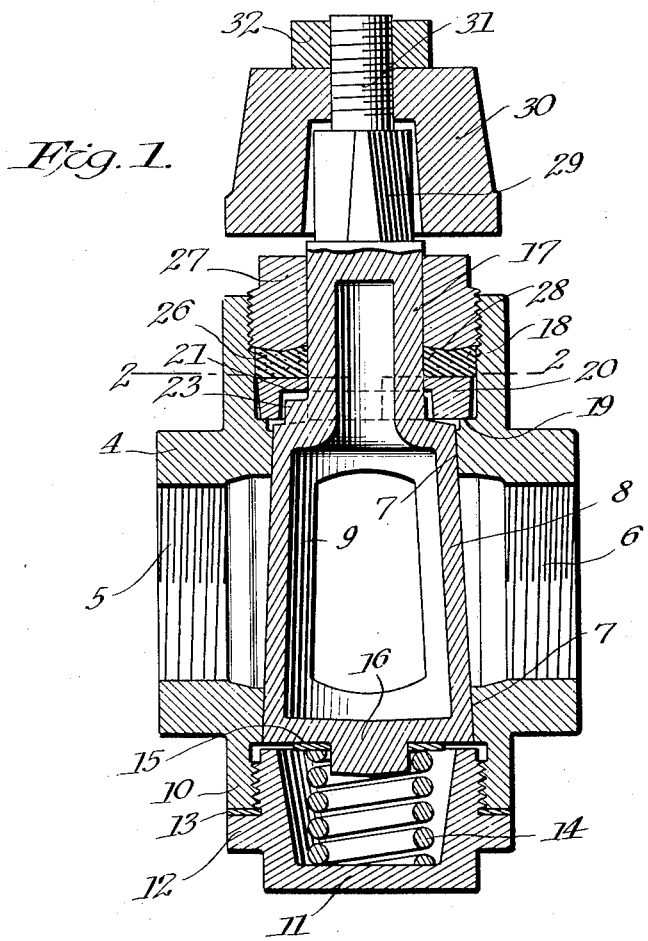
Figure 1 is a vertical section of the improved valve.
Figure 2:
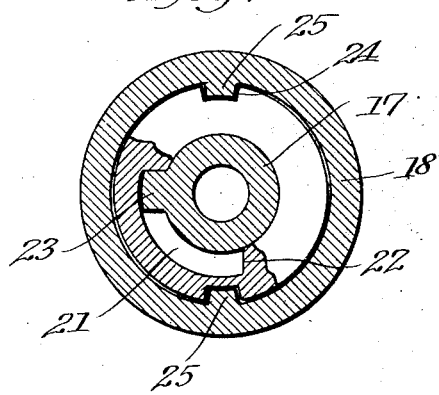
Figure 2 is a transverse section of the same taken on the line 2—2 of Figure 1.
Figure 3:
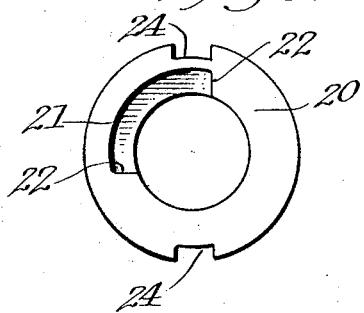
Figure 3 is a plan view of a collar for relieving the plug valve or key from pressure exerted upon a packing member, as well as to form a part of the means for limiting rotation of the key.

Referring now more particularly to the drawings, the numeral 4 designates a valve casing having a passage therethrough terminating in an inlet 5 and an outlet 6. This valve casing is provided with a tapered hole forming a valve seat 7, in which is seated a tapered plug or valve 8 which extends across the passage through the casing, and is adapted to prevent the flow of gas or liquid through the valve casing when in the position shown in Figure 1. This plug valve or key 8 is hollow, and is equipped with diametrically extending ports 9 which, when turned through an arc of 90° from the position shown in Figure 1, are aligned with the passage through the casing to permit the flow of gas or fluid therethrough.

The large end of the valve seat 7 opens out through the bottom of the casing 4 in alignment and concentric with an annular internally threaded depending flange 10, which is adapted to receive an exteriorly threaded cap 11 having an exterior annular flange 12 between which, and the end of the flange 10, is adapted to be compressed a soft metal gasket 13 to prevent the escape of any gas or liquid which might escape between the valve casing and plug 8.

In order to resiliently retain the plug 8 seated upon its seat 7, a compression spring 14 is compressed between the cap 11 and the large end of the plug 8; a suitable anti-friction washer 15 being positioned around a depending central projection 16 of the plug to receive the normal upward thrust of the spring to retain the plug properly seated. Obviously, the tension of the coil spring 14 is such that it will be suitably compressed to the desired degree when the cap 12 is screwed on to properly compress the soft metal gasket 13 in effecting a gas or fluid tight seal.

The opposite or smaller end of the plug 8 is provided with an axial stem 17 which is arranged concentric with respect to a recess formed in the opposite side of the valve casing 4 by the outward projection of an annular internally threaded flange 18, which is arranged concentric to the flange 10 at the opposite side of the casing. An interior annular shoulder 19 is formed within the recess defined by flange 18, and is disposed a slight distance beyond the smaller tapered end of the plug 8, in order to form a seat for a circular metallic collar 20, whereby the latter is supported out of pressural contact with the smaller tapered end of the plug 8. This collar 20 has a loose fit upon the stem 17 of the plug, and its undersurface which is disposed directly opposite the smaller end of the plug 8 is provided with a segmental groove or recess 21 extending substantially through an arc of 90°. The two ends 22 of this groove provide abutments against which a radial lug or projection 23 formed integral with the plug stem 17 abuts when the plug is in either open or closed positions. The collar 20 is provided at diametrically opposite points in its periphery with notches 24 which receive diametrically disposed inwardly extending lugs or projections 25 formed integral with the flange 18 of the valve casing, in order to prevent rotation of the collar 20. Obviously, the tongue or lug 23 cooperating with the spaced abutments 22 will limit the rotation of the plug 8 through an arc of substantially 90°, and are so arranged with respect to one another that the plug is in open position when its lug 23 is engaged with one of said abutments, and is disposed in a closed position when this lug is arranged in contact with the other abutment 22.

In order to effectively seal this end of the valve against leakage, a compressible packing 26, preferably of rubber, surrounds the plug stem 17, and is adapted to be supported upon the collar 20 as shown. An exteriorly threaded gland nut 27 surrounds the stem 17, and is adapted to be threaded into the interiorly threaded flange 18 to engage and compress the packing 26, and to cause its lateral expansion. In order to increase the normal lateral expansion of this packing and to force it tightly into engagement with the interior periphery of the flange 18, the bottom of the gland nut 27 is formed with a substantially conical end produced by shaping the bottom surface with surfaces 28 which converge toward the gasket 26. By so shaping the engaging end of the gland nut 27, the packing 26 is not only compressed down upon the collar 20, but is also caused to expand laterally both inwardly toward the stem 17 and outwardly against the walls of the flange 18, beyond points to which the gasket could be laterally expanded by a flat-faced gland nut. Due to the fact that the collar 20 is supported upon the shoulder 19 free from pressural contact with the small end of the plug 8, it will be obvious that there is no tendency of the pressure exerted upon the packing 26 to exert an unseating tendency upon the plug, regardless of the amount of pressure placed upon this packing. It will also be seen that due to this construction, the collar 20 will not be jammed into engagement with the lug 23 as a consequence of which this lug will always have free movement within the groove 21.

The outer end of the plug stem 17 beyond the gland nut 27 is provided with a squared portion 29 adapted to receive an actuating head 30 which is suitably exteriorly shaped to receive a suitable wrench employed for turning the plug on its seat. The extremity of the stem 17 is reduced and threaded as at 31 to be extended through the actuating head, and to receive a nut 32 for clamping the actuating head upon the squared portion 29.

From the foregoing, it will be noted that both ends of the valve are effectively sealed to prevent leakage of either gas or fluid, due to the fact that any gas or liquid escaping between the plug and casing must first pass around the threads of the cap 11 before it reaches the soft metal gasket 13. Even though the threads permit passage of the medium, which is unlikely in properly machined valves, it could not escape the secondary defense formed by the soft metal gasket 13.

The other end of the valve is also effectively sealed against leakage by the packing 26 which is forced firmly against the inner periphery of the flange 18, as well as the stem of the valve by the gland nut 27, thereby precluding the possibility of the gas or liquid escaping between the threads of the gland nut. It will, therefore, be seen that the collar 20 not only relieves the tapered plug 8 from pressures incident to the compression of the packing 26 and cooperates with the lug 23 in limiting rotation of the plug 8, but also is arranged out of sight and protected in a state to at all times effectively carry out its functions.

Various changes in the size, shape and arrangement of parts may be resorted to without departing from the spirit of the invention or the scope of the appended claims.

I claim:

1. The combination with a valve casing having a valve seat and threaded recess separated by an annular shoulder, a tapered plug valve resting upon said seat, a collar in said recess supported upon said shoulder free of pressural contact with said plug valve means for preventing rotation of said collar when positioned in said casing, said collar having an arcuate groove in its underside, said valve having an upstanding lug operable in said groove and spaced from the top wall of said groove, a compressible packing supported upon said collar, and a plug threaded into said recess for compressing said packing upon said collar.

2. The combination with a valve casing having a tapered valve seat, an annular flange extending outwardly of the casing and arranged concentric with said seat to form an annular shoulder at the juncture of said seat and flange, a tapered plug valve engaging said seat and having a valve stem extended from the small end thereof through said recess, a collar supported upon said annular shoulder free of pressural contact with said valve, said collar having a peripheral notch, said flange having a projection received in said notch to prevent rotation of the collar, said collar having a groove in its underside, said valve having a lug extending into said groove and being spaced from the top wall thereof to relieve the valve from pressure above, a compressible packing supported upon said collar, and a member threaded in said annular flange to compress the packing upon said collar.

In testimony whereof I have hereunto set my hand.

FRANK H. MUELLER.